Jan. 14, 1969  F. L. NESTROCK  3,421,508
CRYOSURGICAL PROBE
Filed Aug. 31, 1966
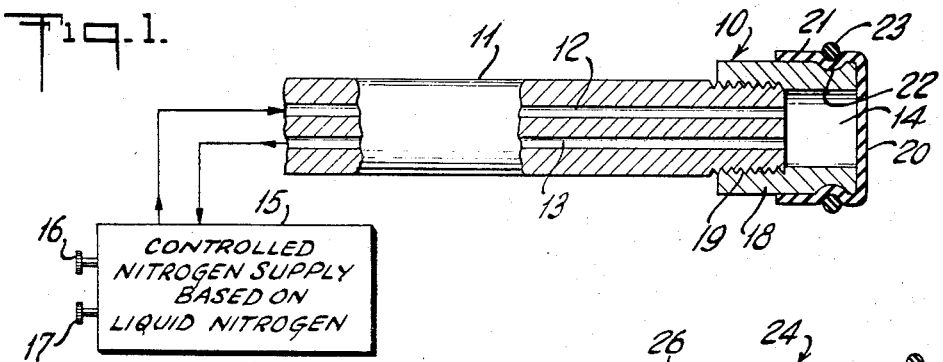
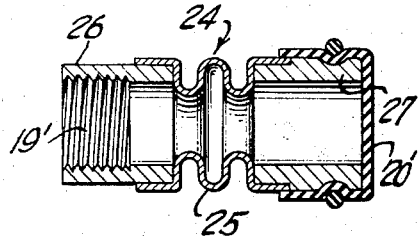
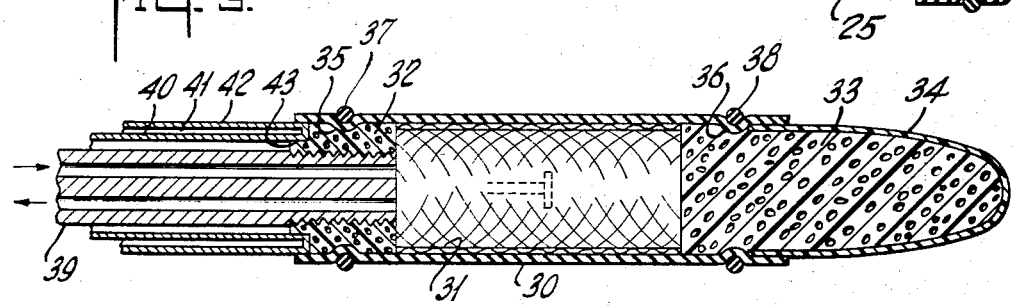
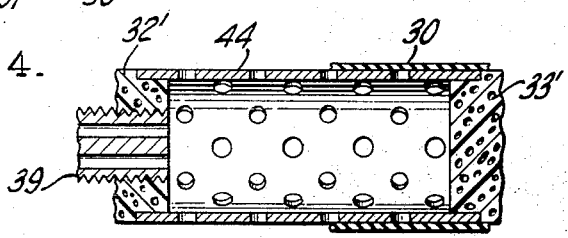
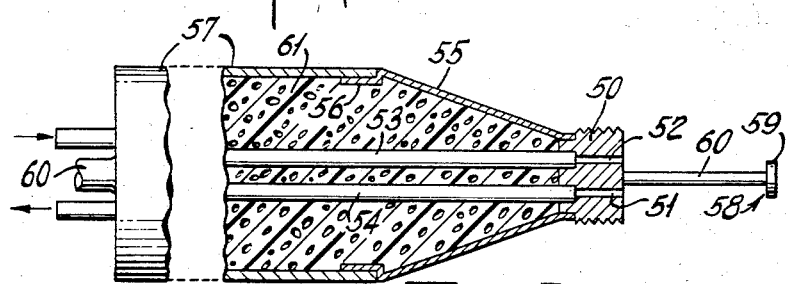
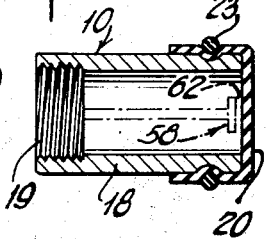
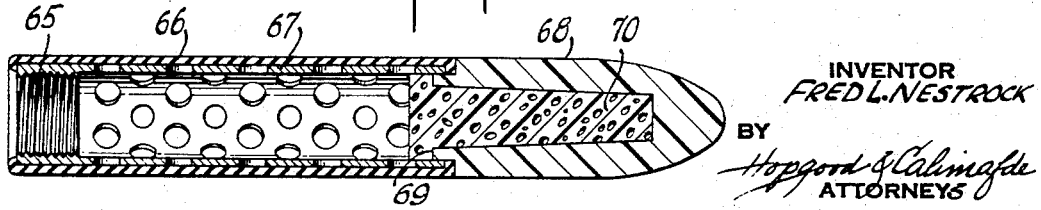
INVENTOR
FRED L. NESTROCK
BY
Hopgood & Calimafde
ATTORNEYS

3,421,508
CRYOSURGICAL PROBE
Fred Leonard Nestrock, Avon, Conn., assignor to Union Manufacturing Company, New Britain, Conn., a corporation of Connecticut
Filed Aug. 31, 1966, Ser. No. 576,268
U.S. Cl. 128—303.1                                    19 Claims
Int. Cl. A61b 17/36; F25d 3/10

This invention relates to cryosurgical probes of the variety which utilizes a flow of supercooled fluid, such as a regulated flow of gas bled from a supply of liquid nitrogen, to determine a localized supercooled area on a probe instrument to be applied to the body.

In prior cryosurgical probes of the character indicated, the parts relied upon for contact with the body have been metallic, thus necessitating heating mechanism for use when attempting to detach the probe from frozen-stuck engagement with the body. Furthermore, such probes do not lend themselves to smooth-gliding movement over any desired body profile or path.

It is, accordingly, an object of the invention to provide an improved cryosurgical probe avoiding the above-noted difficulties.

Another object is to meet the above object with structures of basic simplicity, lending themselves to a variety of configurations suited to particular specialized employments.

A further object is to provide an improved disposable probe of the character indicated.

Still another object is to provide readily replaceable body-contact elements in probes of the character indicated.

A specific object is to provide an improved probe of the character indicated which is inherently non-sticking to the body, which is sufficiently yieldable at contact with the body to be locally self-adapting to body contour, and which may be readily moved along and over desired paths and contours.

Another specific object is to provide such a probe which is inherently sterile, utilizing sterile replaceable elements.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 1 is a fragmentary longitudinal sectional view of a cryosurgical probe of the invention, with schematic illustration of supercooled fluid-flow connections thereto;

FIG. 2 is a longitudinal sectional view of an alternative tip for the probe of FIG. 1;

FIG. 3 is a similar sectional view of another probe construction;

FIG. 4 is a fragmentary sectional view to illustrate an alternative construction for a part of the probe of FIG. 3;

FIG. 5 is a partly broken-away and longitudinally-sectioned view of another alternative probe construction, the probe tip being detached;

FIG. 6 is a longitudinal sectional view of a tip suitable for attachment to the probe of FIG. 5; and FIG. 7 is a similar view illustrating another type of tip attachable to the probe of FIG. 5.

Briefly stated, the invention contemplates a cryosurgical probe which is basically of cupped formation, having one end axially open for connection to a flow of supercooled fluid. Basically, the probe comprises a tubular wall and an end wall, one of which walls includes a relatively softly compliant membrane such as a thin soft rubberlike element which is internally exposed directly to the supercooled liquid and which is externally exposed for direct contact with a part of the body to be treated. Various configurations will be described.

In the arrangement of FIG. 1, a probe tip 10 of cylindrical form is detachably threadedly connected to an elongated probe support 11, having internal conduit means for the supply 12 and for the exhaust 13 of supercooled fluid flowing into and out of the interior volume 14 of the probe tip 10. The fluid supply is schematically designated and may derive the fluid flow from a supply of liquified gas, such as nitrogen, in which case the flowing supercooled fluid is gaseous nitrogen. Manual adjustment 16 will be understood to regulate the flow rate, and further adjustment 17 will be understood to regulate the temperature of gas flow to probe 10.

The probe tip 10 comprises a tubular body 18 of relatively stiff and hard material such as molded plastic or machined brass, and is formed at its attachment or open end with internal threads 19. The other end of the tubular body 18 is closed by a membrane or cap 20 of thin relatively softly compliant natural or synthetic rubber. Membrane 20 may be of flat sheet stock, with sufficient excess edge material to permit folding back along the outer surface of body 18, as at 21, and over a clamp groove 22 formed in body 18 near the closed end. Clamping means such as O-ring 23 adequately secures the assembly and permits ready replacement of membrane 20, for sanitary purposes.

The probe tip 24 of FIG. 2 is intended as an alternate or replacement for the tip 10 of FIG. 1. The essential difference is that the tubular body of tip 24 incorporates an axially flexible central section, provided for example by a Sylphon-bellows element, secured (as by solder) to the end body elements 26—27. The adapter body element 26 has internal threads 19' to fit a suitable support (e.g. support 11 in FIG. 1), and the membrane-support element 27 is grooved to accommodate membrane 20' and its clamping means in the manner already described in FIG. 1.

FIG. 3 illustrates a different employment of the invention in which the softly compliant element 30 is part of the tubular wall, rather than the end wall, of the generally cup-shaped probe tip. The membrane 30 is a thin sleeve, which is preferably of natural or synthetic rubber, positioned by a porous support such as a tubular screen 31 of wire mesh. Screen 31 may be permanently secured to end supports 32–33, as by molding supports 32–33 of plastic with the ends of screen 31 embedded therein. Supports 32–33 are shown formed of relatively hard foamed plastic, for thermal-insulation purposes, and their external surfaces may be coated with a smooth hard shell surface 34 to facilitate insertion in body parts. Supports 32–33 are also shown formed with external clamping grooves 35–36 over which the sleeve 30 extends for clamping by O-rings 37–38; it will be appreciated that the depth of grooves 35–36, the size of rings 37–38, and the thickness of sleeve 30, are shown with exaggerated proportions in the drawing, for purposes of clearly delineating the parts, and that it is desired to obtain as smooth a profile as possible for the periphery of the probe of FIG. 3.

The remainder of the probe of FIG. 3 is illustrative of a manner of supporting and manipulating the described probe tip. An elongated tubular support 39, similar to the support 11 of FIG. 1, is provided with inlet and exhaust passages for conducting a flow of supercooled fluid into and out of the interior volume within screen 31, support 39 being threaded into the bore of adapter support element 32. For insulating purposes, foamed plastic may be formed around support 39 but I prefer to employ an annular Dewar flask, defined by spaced concentric sleeve elements 40–41 sealed to each other at opposite axial ends and defining a sealed evacuated insulating region 42 therebetween. The Dewar flask 40–41 may be supported on element 39, or in spaced relation thereto (as shown), relying on shoulders, as at 43 on adapter support 32, for radial location.

FIG. 4 illustrates a modification of FIG. 3 in which a relatively stiff perforated sleeve 44 is secured to the end supports 32'–33' and serves as the porous member in place of screen 31, to position sleeve 30 for direct exposure to the supercooled fluid within the volume of sleeve 44.

FIG. 5 illustrates another form of handle part, lending itself particularly to selective accommodation of various differently configured removable probe-tip parts, respectively shown in FIGS. 6 and 7. The handle part of FIG. 5 is shown to comprise a threaded adapter element 50 having spaced bores 51–52 for accommodation of inlet and exhaust fluid flows. Bores 51–52 may be counterbored to receive elongated fluid-supply tubes 53–54, soldered in place. The outer contour of the handle is defined by a conical element 55, secured as by solder to adapter 50, and formed at its large end with a flanged shoulder 56 for support of an elongated outer tube 57. A thermostatic element 58 having a small-area, generally flat outer surface 59 is carried at the end of a suitable support or stem 60, extending through adapter 50 and out the rear end of the handle; element 58 may incorporate a thermocouple and stem 60 may carry electrical leads to the thermocouple. Also, if desired element 58 may incorporate an electric heater, for transient excitation by conventional means, within stem 60, although operation without such a heater is expressly contemplated by this invention. To complete the assembly, the entire remaining interior of the handle shell 55–57 may be filled with a foamed plastic 61, for thermal-insulating purposes.

The use of the handle of FIG. 5 contemplates attachment of probe-tip elements suitably proportioned to the axially outward projection of thermal-detector element 58. For example, in FIG. 6 the tip 10 of FIG. 1 is again shown, but with thermal element 58 (dotted outline) in its intended ultimate secured relation to the back surface of membrane 20, the clearance 62 in this connection being relatively small compared to the tip area 59, and the tip area 59 being relatively small compared to the effective circular end face of membrane 20.

In FIG. 7, there is illustrated a disposable tip of the FIG. 3 variety, but adapted for removable attachment at 65 to the adapter 50 of FIG. 5, in which case the thermal detection tip 58 will be understood to extend substantially into the central region of the volume within sleeve membrane 66. Sleeve 66 is shown supported on a perforated sleeve 67, one end of which is formed with the attachment threads 65. Since the probe of FIG. 7 is disposable, the ends of sleeve membrane 66 may be formed inwardly over and bonded to the ends of support sleeve 67. A smooth hollow plastic tip-end shell 68, as of molded styrene or polyethylene, is externally contoured as desired and has a reduced inner end 69 to fit within and locate against the outer end of the membrane-sheathed sleeve 67. A filling of foamed plastic 70 completes the assembly, with anchorage in at least some of the pores or openings in sheath 67.

It will be seen that I have described improved cryosurgical devices which meet the foregoing objects and extend the range of cryosurgical operations. Those probes which have flat end areas, as in FIGS. 1, 2, and 6, are intended primarily for external application to the body, and the effective probe area may be as small or as large as mechanically feasible, depending on the local treatment problem; for example, probe tips with circular end areas as small as 3/16-inch and up to 1-inch diameter are feasible, the rubberlike membrane being soft sheet material of thickness generally in the range 0.003 to 0.030 inch, the thinner materials being generally employed for the smaller diameter applicator probes.

Flat-end probes are specifically useful for cryogenic treatment of skin disorders, such as warts and cancers, as well as for simple internal operations such as tonsillectomies; and in the case of FIGS. 5 and 6, light pressure applied to the body at 20 enables the thermal-detector area 59 to contact membrane 20 and thus directly monitor (and, if desired, automatically control) the treatment temperature. Tubular probes, as in FIGS. 3, 4, and 7 are specifically useful for internal operations, such as prostate operations, where insertion in and treatment of a body passage is necessary; in such case, the insulated tip shell 34 or 68 will be understood not only to assure smooth entry and removal but also (by the extent of its projecting length) to assure an accurate positioning reference for the membrane 66.

While the invention has been described in detail for the preferred forms shown, it will be understood that modifications may be made without departing from the scope of the invention as defined in the claims which follow.

What is claimed is:

1. A cryosurgical probe of cupped formation and comprising a generally cylindrical wall and an end wall effectively closing one axial end of said cylindrical wall, the other end of said cylindrical wall being open, and adapter means at said other end for attachment to a supply of supercooled fluid flow, one of said walls including an outwardly exposed membrane of relatively softly compliant material, said membrane being internally directly exposed to supercooled fluid introduced via said other end into the interior of said probe.

2. The probe of claim 1, in which said membrane is at least a part of said cylindrical wall.

3. The probe of claim 1, in which said membrane is at least a part of said end wall.

4. A cryosurgical probe, comprising a relatively stiff tubular element adapted for attachment at one end to a supply of supercooled fluid flow, and a membrane of relatively softly compliant material carried at the other end of said element and closing said end to fluid flow.

5. A probe according to claim 4, in which said softly compliant material is rubberlike.

6. A probe according to claim 4, in which said tubular element has a peripheral groove near the closed end, said membrane overlapping said groove, and clamp means retaining said membrane at said groove.

7. A probe according to claim 4, in which said tubular element includes a flexible bellows intermediate the ends thereof.

8. A cryosurgical probe, comprising a relatively stiff porous tubular element, non-porous means closing one end of said element, the other end of said element being relatively open, adapter means at said open end for attachment to a supply of supercooled fluid flow, and a relatively thin sleeve of rubberlike material surrounding said tubular element and supported thereby, said sleeve being sealed against fluid flow at its respective ends with respect to said non-porous means and with respect to said adapter.

9. The probe of claim 8, in which said non-porous means has a peripheral groove near its connection to said tubular element, said sleeve overlapping the groove, and clamp means compressing the overlapping part of said sleeve in the groove.

10. The probe of claim 8, in which said adapter has a peripheral groove near its connection to said tubular element, said sleeve overlapping the groove, and clamp means compressing the overlapping part of said sleeve in the groove.

11. The probe of claim 8, in which said non-porous means is an elongated element conforming generally to the peripheral extent of said sleeve and having a smoothly rounded end remote from said sleeve.

12. The probe of claim 11, in which said non-porous means is a smoothly continuous outer shell, and a filling of insulating material within said shell.

13. The probe of claim 8, in which said porous tubular element is a wire mesh.

14. The probe of claim 8, in which said porous tubular element is a perforated shell of relatively stiff material.

15. A cryosurgical probe, comprising an elongated handle part and a tip part detachably secured to one end of said handle part; said handle part comprising a threaded adapter element at said one end, inlet and exhaust gas-flow conduit means generally centrally located within said handle part and adapted at the other end of said handle part for connection to gas-flow supply and exhaust facilities, said conduit means extending through said adapter element and open at the outer axial end thereof, said handle part further comprising thermal-insulating means surrounding said conduit means for safe manual grasping; and said tip part being of cupped formation and comprising a generally tubular wall and an end wall effectively closing one axial end of said tubular wall, threaded adapter means at the other end of said tubular wall in detachable removable engagement with said threaded adapter element, one of said walls including an outwardly exposed membrane of relatively softly compliant material, said membrane being internally directly exposed to super-cooled fluid flowing via said conduit means into the interior of said tip part.

16. The probe of claim 15, in which said handle part includes thermal-detection means, comprising a support stem projecting axially beyond the exposed end of said adapter element into the interior of said tip part, and a detector element at the extended end of said stem in spaced relation with said membrane.

17. The probe of claim 16, in which said membrane constitutes the end wall of said tip part, said detector element having an end surface in closely spaced relation to the central part of said end wall and of substantially less area than said end wall.

18. The probe of claim 17, in which the closely spaced relation is such in terms of the compliance of said membrane that upon application of said end wall to a body part, said membrane may be deflected into contact with said detector element.

19. The probe of claim 16, in which said membrane is part of said cylindrical wall, said detector element being located generally centrally of the effective coverage of said membrane.

References Cited

UNITED STATES PATENTS

| | | | |
|---|---|---|---|
| 3,125,096 | 3/1964 | Antiles et al. | 128—401 |
| 3,272,203 | 9/1966 | Chato | 128—303.1 |
| 3,369,549 | 2/1968 | Armao | 128—303.1 |

L. W. TRAPP, *Primary Examiner.*

U.S. Cl. X.R.

62—293; 137—636.4; 251—61.3